Feb. 7, 1950 W. O. GOEBEL 2,496,285
FEEDER FOR HONEYBEES
Filed July 31, 1947
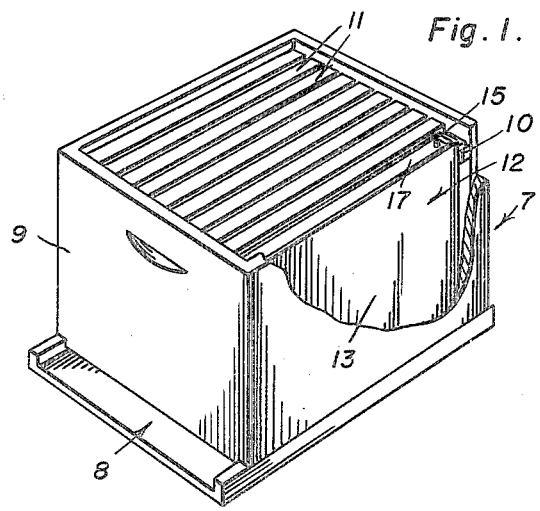
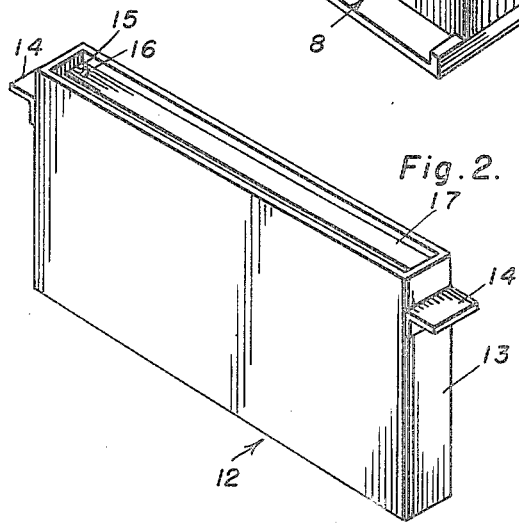
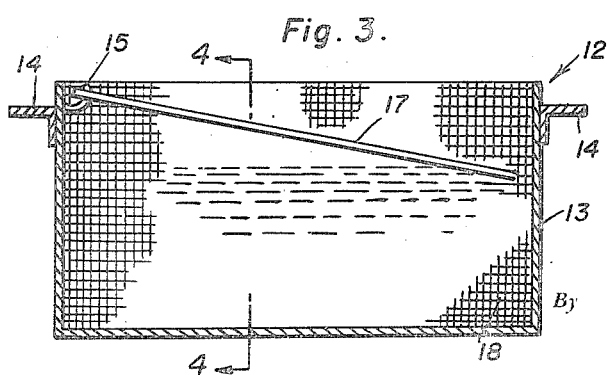
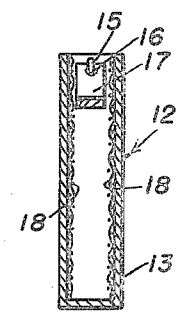
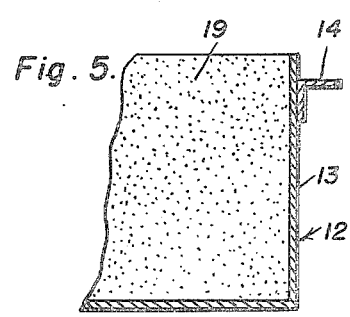
Inventor
Wilbur O. Goebel Patented Feb. 7, 1950

2,496,285

UNITED STATES PATENT OFFICE 2,496,285

FEEDER FOR HONEYBEES

Wilbur O. Goebel, Knoxville, Iowa

Application July 31, 1947, Serial No. 765,170

2 Claims. (Cl. 6—5)

This invention relates to a novel and improved feeder for honeybees, a special type which is adapted to fit with requisite nicety into a standard-type beehive.

In the beehive under consideration, the customary brood frames are of general rectangular form and are removably racked and suspended in the hive in systematic parallelism. One object of the present invention is, therefore, to simply remove one of the regular brood frames and substitute therefor an insertable and removable feeder, the latter being constructed to properly occupy the space thus provided therefor, whereby to provide a feeder which is aptly suited for the intended purposes.

More specifically, it is an object of the invention to provide a feeder unit in the form of a substantially rectangular open-top tank, the latter being appropriate and satisfactory to contain the liquid bee feed and being readily available for accessible replenishment and cleansing purposes.

Another object of the invention is to provide a tank-type feeder unit along the lines stated wherein a float is mounted in the upper open portion, said float serving as an adequate landing and feeding platform for the bees from the adjacent and coacting brood frames.

Another object of the invention is to provide a float-equipped liquid feed tank having hanger brackets which are adaptable to the end rails in the beehive employed for supporting the frames.

Another object of the invention is to provide an open top, float-equipped feeder tank constructed from metal, plastic, or other appropriate materials wherein opposed longitudinal vertical walls of said tank are appropriately roughened to provide climbing surfaces for the bees, thus avoiding drowning of said bees if and when the buoyant platform becomes overweighted and sinks too low.

Other objects and advantages will become more readily apparent from the following description and the accompanying illustrative drawings.

In the drawings, wherein like numerals are employed to designate like parts throughout the views:

Figure 1 is a fragmentary perspective view of a conventional-type beehive showing the improved bee feeder unit or tank mounted therein for use;

Figure 2 is a perspective view of the tank per se;

Figure 3 is a longitudinal sectional view showing the interior construction;

Figure 4 is a transverse vertical sectional view on the plane of the line 4—4 of Figure 3, looking in the direction of the arrows; and Figure 5 is a fragmentary sectional view of an end portion showing a modification.

Referring now to the drawings by distinguishing reference numerals, it will be seen that the beehive is denoted by the numeral 7, the same having an appropriate entrance 8 and being characterized by a box 9 with supporting cleats or rails 10 for the conventional brooder frames 11.

As before stated, one of the frames 11 is removed to make way for the insertable and removable feeder unit 12. The latter is in the form of a substantially rectangular tank 13 and is provided on its end walls with L-shaped supporting clips or brackets 14 which rest on the rail 10 as shown in Figure 1 to properly support the tank in the beehive. On the interior and at one end, I provide an adapter hook 15 to accommodate an aperture 16 in the adjacent end of the buoyant platform or float 17. The latter is in the form of a rectangular member and fits with requisite nicety in the upper open-end portion of the tank.

It is to be pointed out here that the tank may be of metal or other appropriate materials, and in many instances will be of plastic material. The float 17 may be of wood, but since wood may be too porous and may absorb too much of the liquid feed which is contained in the tank, I will also make the float of buoyant plastic or whatever equivalent material meets the requirements of the trade and beekeepers. Where the tank is of sheet metal, as shown, for example, let us say, in Figure 3, the longitudinal side walls will be covered with screen wire or equivalent surfacing material 8. This is to provide the desired roughened surfaces and to provide climbing and scaling facilities for bees who might otherwise be drowned if and when the floatable platform becomes overloaded. These roughened surfaces or walls are considered highly important to insure safety results.

If the tank is of plastic, the side walls will be suitably roughened, in any appropriate manner, as indicated at 19 in Figure 5.

In practice, one of frames 11 is removed and the bee feeder tank 12 is inserted in its place. It then takes the position illustrated in Figure 1. In this position, it is readily available to bees coming from the frames and the bees, obviously, land on the platform and take of the liquid feed in the tank.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A bee feeder for use in standard-type hives comprising a substantially rectangular open-top metal tank, the interior surfaces of opposed longitudinal walls of said tank being roughened for convenient bee scaling and climbing, said tank being provided at opposite ends with outstanding supporting clips, said tank being provided on its interior with a hook, and a non-absorbent float swingably mounted at one end on said hook and confined within the space provided by the walls of said tank.

2. As a new article of manufacture, a honeybee feeder adapted to take the place of a conventional-type brood frame and corresponding in shape and size to such a brood frame comprising a liquid-proof, non-absorbent tank for liquid bee feed, means for supporting the tank on customary rails in a standard-type beehive, the interior surfaces of the walls of said tank being roughened to provide climbing and scaling surfaces for bees who might, without assistance, drown themselves in the liquid feed, a platform of buoyant material impervious to the passage of liquid, said platform corresponding in marginal proportions to the interior cross section of said tank and located in the tank, and a hook mounted on the interior of one end wall of the tank, the corresponding end of said platform being apertured and detachably and hingedly hung on said hook.

WILBUR O. GOEBEL.

REFERENCES CITED

The following references are of record in the file of this patent:

UNITED STATES PATENTS

| Number | Name | Date |
|---|---|---|
| 562,853 | Rooker | June 30, 1896 |
| 784,072 | Roberts | Mar. 7, 1905 |
| 1,406,568 | Lubben | Feb. 14, 1922 |

OTHER REFERENCES

ABC and XYZ of Bee Culture, by A. I. and E. R. Root, published by the A. I. Root Co., Medina, Ohio, 1923, page 353.